United States Patent Office 3,340,168
Patented Sept. 5, 1967

3,340,168
PRODUCTION OF 2,6-DICHLOROBENZYLIDENE-
CHLORIDE
Stig Hjalmar Johannes Åkerström, Karlskoga, Sweden,
assignor to Aktiebolaget Bofors, Bofors, Sweden, a corporation of Sweden
No Drawing. Filed Apr. 22, 1963, Ser. No. 274,777
Claims priority, application Sweden, Apr. 24, 1962,
4,522/62
7 Claims. (Cl. 204—158)

This invention relates to 2,6-dichlorobenzalchloride, hereinafter referred to as 2,6-dichlorobenzylidenechloride. More particularly, it is directed to a novel method of producing that compound.

2,6-dichlorobenzylidenechloride is useful as a starting material for the production of 2,6-dichlorobenzonitrile, the latter being an excellent herbicide.

The transformation of 2,6-dichlorobenzylidene to 2,6-benzonitrile is carried out in known ways, e.g., through hydrolysis of the benzylidene compound to the corresponding benzaldehyde, followed by oximation and dehydration.

Heretofore, 2,6-dichlorobenzylidenechloride has been produced from 2-nitro-6-chloro-toluene via the intermediate production of 2-chloro-6-amino-toluene and 2,6-dichlorotoluene. That method is very complicated and expensive.

It is among the principal objects of the present invention essentially to simplify the production of 2,6-dichlorobenzylidenechloride; and to reduce the cost thereof.

The object of this invention is achieved by using, as a starting material, 6-chloro-toluene-2-sulfo-chloride, which is chlorinated at a temperature of approximately 200° C. Such chlorination results in the direct production of 2,6-dichlorobenzylidenechloride, in a very high yield (approximately 95%). The fact that such chlorination results in the direct formation of the 2,6-dichlorobenzylidenechloride is surprising, as it had not been expected that the sulfochloride group could be substituted.

6-chloro-toluene-2-sulfo-chloride can be produced from o-toluene-sulfo-chloride, a simple compound and one that can be produced at low cost. The o-toluene-sulfo-chloride is mono-chlorinated which results in the formation of a mixture of 6-chloro-toluene-2-sulfo-chloride and 4-chloro-toluene-2-sulfo-chloride. These isomers can be separated by fractional distillation. It is alost possible to effectuate separation at a later stage.

The mixture of isomers (6-chloro-toluene-2-sulfo-chloride and 4-chloro-toluene-2-sulfo-chloride) can be chlorinated at approximtaely 200° C., resulting in the formation of a mixture of 2,6-dichlorobenzylidenechloride (Compound I) and 2,4-dichlorobenzotrichloride (Compound II). That mixture can behydrolyzed with 90–100% sulfuric acid, from which are obtained 2,6-dichlorobenzaldehyde and 2,4-dichlorobenzoic acid which are readily separable. The separation of Compounds I and II can also be effectuated by means of fractional distillation.

The chlorination of the 6-chloro-toluene-2-sulfo-chloride, either per se, or in admixture with the 4-chlorotoluene-2-sulfo-chloride can be carried out by use of thionyl chloride or molecular chlorine. The chlorination can be carried out in the presence of a phosphorus halogenide as catalyst. Also, the chlorination can be carried out in the presence of ultra-violet light, such radiation advantageously shortening the time required to effectuate the chlorination.

An advantage of using molecular chlorine, i.e., anhydrous gaseous chlorine, is that it is cheaper and easier to handle than thionyl chloride.

The chlorination of the starting material can be carried out at a temperature of 150–250° C., preferably at 200° C.

The following are examples in accordance with this invention:

Example 1

224 g. of 6-chloro-toluene-2-sulfo-chloride is heated to approximately 200° C. Then dry gaseous chlorine is conducted therethrough in the presence of ultra-violet light. Sulphur dioxide is thereby removed. The chlorination is carried on as long as hydrogen chloride is evolved or until a constant weight is obtained. This takes approximately ten hours. The last chlorine atom in the side chain goes in much more slowly than does the first one, owing to the steric hindrance of the two ortho substitutents. Upon completion of the chlorination, the reaction mass is fractionated under vacuum. The obtained 2,6-dichlorobenzylidenechloride is an oil that is quite pure, with a boiling point of 132–136° C. at 12 mm. Hg. The yield is 276 g.

It is readily hydrolyzed with 95% sulfuric acid to form the corresponding aldehyde in high yield and having a melting point of 68.5–70° C.

Example 2

224 g. of a mixture of 6-chloro-toluene-2-sulfo-chloride and 4-chloro-toluene-2-sulfo-chloride are heated to 200° C. The anhydrous gaseous chlorine is conducted therethrough in the presence of ultra-violet light. At the start of the reaction, a mixture of sulphur dioxide and hydrogen chloride is evolved; and later on mostly the latter gas. The chlorination is carried on for about ten hours or until a constant weight is obtained. The obtained mixture of 2,6-dichlorobenzylidenechloride and 2,4-dichlorobenzotrichloride is hydrolyzed by being poured into two kilograms of 95% sulfuric acid at a temperature of about 50° C. Then the acid reaction mixture is poured into ice water. The precipitate formed is filtered, and then heated with sodium hydroxide to remove 2,4-dichloro-benzoic acid therefrom. The undissolved residue which consists of 2,6-dichlorobenzaldehyde is filtered and recrystallized from light petroleum. Yeld: 75 g. M.P.: 67–69° C.

Example 3

2,6-dichlorobenzylidenechloride is produced in accordance with the method described in Example 1, except that to the 224 g. of 6-chloro-toluene-2-sulfo-chloride there are added 8 g. of phosphorus trichloride.

Example 4

The method is that described in Example 2, except that the phosphorus halogenide is included as described in Example 3.

It will be understood that the foregoing description of the invention and the examples set forth are merely illustrative of the principles thereof. Accordingly, the appended claims are to be construed as defining the invention within the full spirit and scope thereof.

I claim:
1. Method of producing 2,6-dichlorobenzylidenechloride which comprises adding at a temperature of about 150–250° C. a chlorinating agent selected from the group consisting of chlorine and thionyl chloride to 6-chlorotoluene-2-sulfo chloride until no further chlorination occurs.

2. Method in accordance with claim 1 wherein the chlorination is carried out at a temperature of about 200° C.

3. Method in accordance with claim 2 wherein the chlorination is effectuated by gaseous chlorine.

4. Method in accordance with claim 2 wherein the chlorination is effectuated by thionyl chloride.

5. Method in accordance with claim 1 wherein the chlorination is effectuated by gaseous chloride.

6. Method in accordance with claim 1 wherein the chlorination is effectuated by thionyl chloride.

7. Method in accordance with claim 1 wherein the 6-chloro-toluene-2-sulfo-chloride is present in admixture with its 4-chloro isomer.

References Cited

UNITED STATES PATENTS

| 3,230,268 | 1/1966 | Kobayashi et al. | 260—651 |
| 3,238,243 | 3/1966 | Falbe et al. | 204—158 |

JOHN H. MACK, *Primary Examiner.*

H. S. WILLIAMS, *Assistant Examiner.*